Dec. 18, 1962   F. R. CHAFFIN   3,068,513
CONTINUOUS MOLDING PROCESS AND APPARATUS
Filed Dec. 24, 1958   3 Sheets-Sheet 1
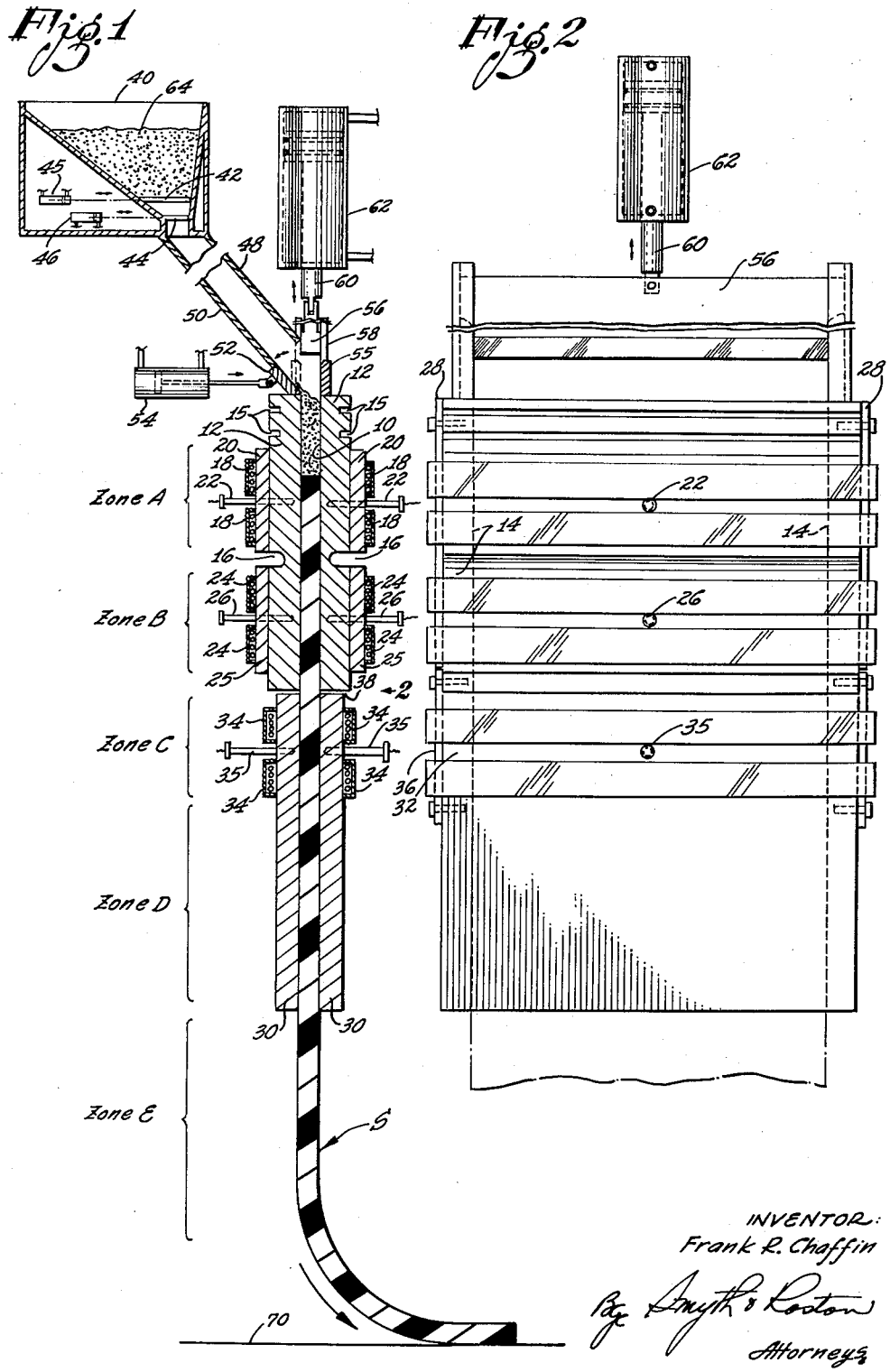
INVENTOR:
Frank R. Chaffin Dec. 18, 1962 F. R. CHAFFIN 3,068,513
CONTINUOUS MOLDING PROCESS AND APPARATUS
Filed Dec. 24, 1958 3 Sheets-Sheet 2
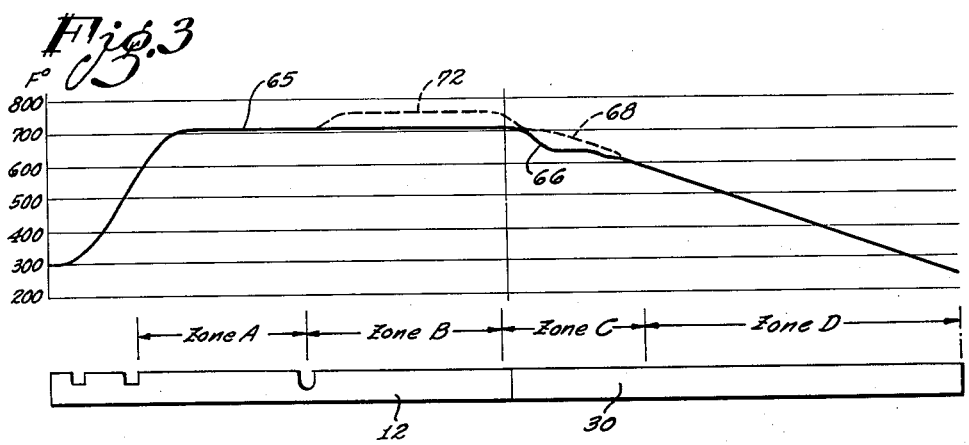
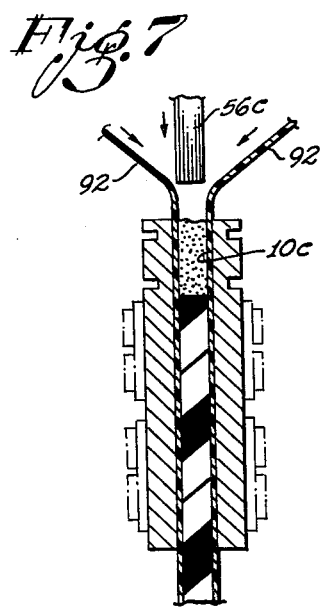
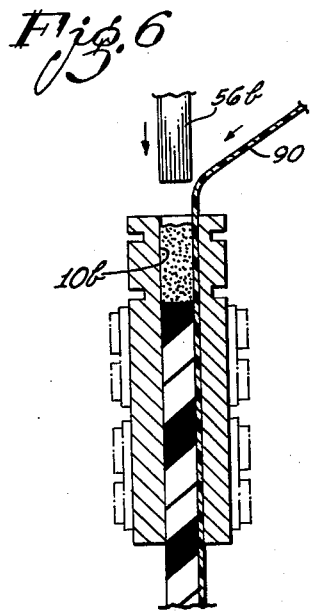
INVENTOR:
Frank R. Chaffin Dec. 18, 1962 — F. R. CHAFFIN — 3,068,513
CONTINUOUS MOLDING PROCESS AND APPARATUS
Filed Dec. 24, 1958 — 3 Sheets-Sheet 3
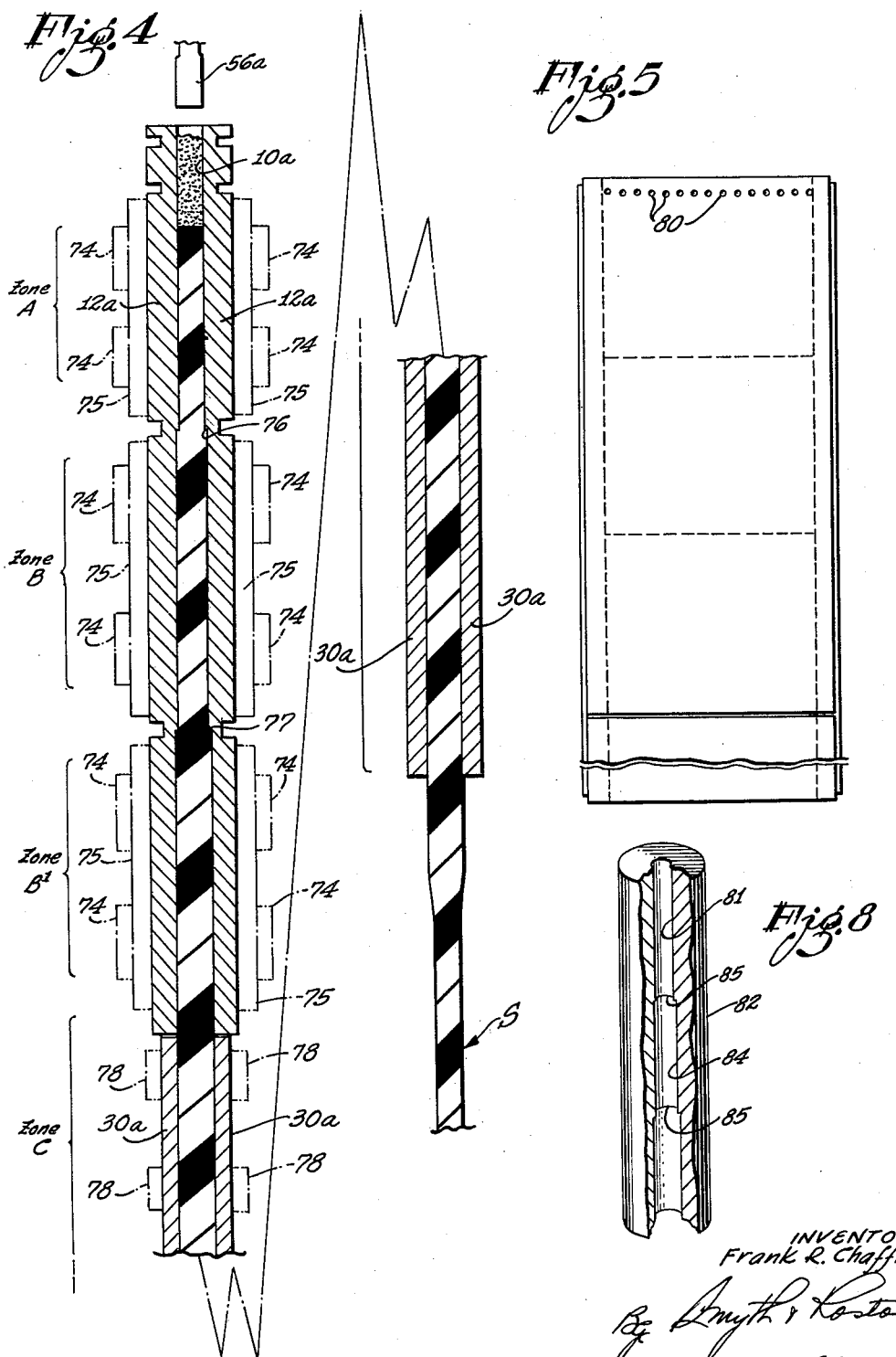

3,068,513
CONTINUOUS MOLDING PROCESS AND
APPARATUS
Frank R. Chaffin, Los Angeles, Calif., assignor to W. S.
Shamban & Co., Culver City, Calif.
Filed Dec. 24, 1958, Ser. No. 782,746
10 Claims. (Cl. 18—12)

This invention relates to a method of and an apparatus for forming sheets and rods of plastic material.

The method of the invention is applicable to a synthetic resin or plastic in granular form that is capable of being fused or sintered with the application of heat and pressure to a partially amorphous and partially crystalline form. A plastic material suitable for the process, for example, is a tetrafluoroethylene (TFE) resin, commonly available under the trade name "Teflon."

A material of the type to which the invention pertains has a given transition temperature which may be termed the critical temperature or sintering temperature, above which the material is amorphous or gelatinous and below which the material is solid. The transition temperature of TFE resins is approximately 621° F. The raw material is granular, and to form a sheet or rod, the granular material must first be fused or sintered to form a gelatinous mass well above the critical temperature and then the gelatinous mass must be cooled to below the transition temperature.

The extent to which the amorphous material is converted to crystalline form determines the flexibility, resilience and ultimate strength of the product, and this extent depends on the rate of cooling. The rate of cooling, then, must be closely controlled to determine whatever degrees of these properties are desired in the final product. In the particular practices of the invention covered by the present disclosure, relatively low crystallinity is sought to result in substantial flexibility, resiliency and ultimate strength.

The invention has been initially practiced for the production of TFE resin sheets one inch thick. The utility of the invention will be understood by considering the problems encountered in attempting to produce a sheet one inch thick by conventional molding procedures.

A conventional molding procedure comprises the following steps:

(1) The granular raw material is uniformly distributed over the area of a mold cavity.

(2) An upper pressure plate is inserted and a pressure of between 1,000 and 10,000 p.s.i. is applied to compress the granular material to a volume of one-fourth the initial volume or less, depending upon the particular grade of the raw material.

(3) The preformed resin sheet is removed from the mold and sintered in an oven one hour at 720° F. for each one-fourth inch of thickness.

(4) If flat surfaces and close tolerances are important, the sintered material is cooled to approximately 575° F. at a rate not greater than 45° F. per hour and is then removed from the oven.

A coining step may be added to the procedure for such reasons as reducing the likelihood of fracture, relieving internal stresses, preventing distortion, and forming glossy surfaces. A coining step consists of cooling the sintered sheet under pressure in a mold, the mold being either the original mold or a special coining mold. To avoid fractures and to relieve internal stresses to result in a perfectly flat sheet as the end product, the coining mold may be operated at an elevated temperature.

It is readily apparent that serious difficulties are encountered in any attempt to follow this prior art procedure for the production of a TFE resin sheet one inch thick, and especially a sheet of substantial area.

In the first place, what is termed pressure decay must be taken into consideration. The pressure in the material falls off rapidly with increasing distance from the interface where the pressure is applied. If a minimum pressure of 600 p.s.i. is desired at all levels of the preformed sheet, many times 600 p.s.i. must be applied to the upper surface of the sheet, the necessary pressure being as high as two tons per square inch or higher.

Another difficulty resides in a certain dilemma. Even with the greatest of care, the granular material cannot be uniformly distributed over the area of the flat die. Consequently, if a flat rigid metal pressure plate is used in the molding step in an endeavor to achieve uniformity in thickness in the preformed sheet, the density of the sheet will vary in different areas in accord with the non-uniform distribution of the granular material. On the other hand, if a common practice is followed of interposing a rubber-like blanket between the pressure plate and the granular material in an endeavor to achieve substantially uniform density over the area of the sheet, the inevitable result will be a sheet of varying thickness. If both uniform thickness and uniform density are required, the only answer is to interpose a rubber-like blanket to achieve the uniform density and then to shave the resultant uneven sheet to produce the desired planar accuracy.

It has been found that even when density variation may be disregarded, a high degree of accuracy in the final thickness of the sheet cannot be attained because the pressure plate cannot be controlled with close precision. Consequently, a shaving step is inevitable where a flat sheet of highly accurate and uniform thickness is mandatory.

It may be readily appreciated that serious difficulties are encountered in designing a pressure-applying apparatus for the fabrication of TFE resin sheets of any substantial area and thickness. It is difficult enough to design and construct apparatus for applying a pressure of two tons per square inch over a relatively small area, say an area of one square foot, and these difficulties multiply tremendously in any attempt to process a sheet from one foot to four feet wide and several feet in length.

Still another difficulty arises in carrying out a heating cycle. If an oven is employed, a large mass of metal in the environment of the resin in process must be changed in temperature to produce a change in temperature of the resin. The same problem arises if the material is maintained under hydraulically-induced pressure by massive structure during a heating and cooling cycle.

A further difficulty is in the conflict of considerations that is encountered when it is desired to add a coining step for the multiple purposes of reducing fracture, relieving internal stresses and producing smooth polished sheet surfaces. To minimize fracture and relieve internal stresses, the temperature of the coining die should be relatively high, say on the order of 600° F. or higher, while, on the other hand, a coining operation to produce a smooth polished surface requires cool die surfaces.

Finally, the most serious drawback is that the described conventional molding procedure is so slow that it is excessively costly. Considerable time is required for initial distribution of the granular raw material in the open die with the required care. The sintering step requires one hour for each one-fourth inch of thickness, and so would require four hours for a one inch sheet. At a cooling rate of 45° F. per hour, three additional hours are required to bring the temperature of the material down from 720° F. to 575° F. Even more time is required for cooling the resin to a recommended temperature of approximately 350° F. during the coining step before the resin is exposed to the atmosphere for final cooling. The coining step cannot be eliminated if a flat stress-free sheet is required for the final product.

The present invention is based on certain discoveries as to what may be accomplished by continuously forming a sheet or rod of a resin of this general character by ramming the resinous material by small increments through a passage of the desired cross-sectional configuration with controlled temperature. These discoveries may be listed as follows:

(1) The applied ram pressure may be relatively low if the increments are relatively small to avoid excessive pressure decay. A sheet one inch thick may be formed progressively longitudinally in one-half inch increments, the pressure decay over a distance of one-half inch being approximately one-fourth of the pressure decay that occurs over a distance of one inch.

(2) The molding passage may be extended to provide controlled cooling of the traveling molded material under pressure. Thus the same passage that is employed for the initial steps of preforming and sintering may be used for the equivalent of a coining step. Such an arrangement permits a continuous process in which preforming, sintering, coining and cooling are performed simultaneously with no intervening lost time.

(3) Formed sheets and rods may be produced at a relatively high speed if the passage is extended to afford the minimum time interval required for heat transfer to the material to raise the temperature of the material above the transition temperature.

(4) If the walls of the passage are appropriately heated, heat transfer to the traveling material is exceedingly rapid and may be closely controlled. With the exceedingly rapid heat transfer, the time required for the heating cycle may be drastically reduced. As stated above, more than seven hours would be required to carry out the complete cycle of fabricating a sheet of one inch thickness by the above described prior art procedure if it were possible to use the prior art procedure for a sheet of substantial area. In contrast, the whole fabrication cycle of the present invention may be carried out in less than an hour.

(5) The application of heat and the resulting temperature of the traveling material may be controlled with substantial independence in different zones along the path of the traveling material. It has been found that this purpose may be served by providing heat barriers between the successive zones simply by removing metal from the exterior of the passage walls.

(6) The processing pressure effective inside the passage may be controlled by controlling the frictional resistance to movement of the material through the passage.

(7) The frictional resistance to movement of the material through the passage may be increased either by lengthening the passage or by creating a temperature rise at an intermediate point in the travel of the material through the passage. The local expansion of the traveling material created by the local temperature rise causes the desired increase in resistance.

(8) The frictional resistance in a mold passage of relatively long dimension, a length dimension that would ordinarily result in intolerably excessive pressure, may be lowered to appropriate bounds by giving the passage a stepped configuration, the passage being enlarged at spaced successive points in the direction of material travel.

(9) The use of such a passage in the new procedure results in a finished sheet of uniform high density.

(10) The new procedure results in highly accurate and uniform thickness dimension.

(11) The procedure avoids the conflict between the desirability of coining a sheet with a heated mold both for the purpose of reducing fractures and for relieving internal stresses and the desirability of coining the sheet material with relatively cool mold surfaces for the sake of producing a smooth polished finish. The traveling material is initially maintained under appropriate pressure and temperature to relieve the internal stresses and thereafter is moved through the cooler end of the passage to be polished thereby.

(12) The conditions in the cooling stage may be readily controlled for any desired degree of crystallzation in the finished product.

(13) A sheet of the desired high degree of flatness may be produced by adequately relieving the internal stresses in the cooling stage, including creepage stresses, and by employing a vertical passage with a downward direction of material travel and by permitting the sheet issuing from the passage to hang downward for final air cooling with the resin sheet maintained under longitudinal tension by its own weight.

(14) A laminated sheet structure may be produced simply by feeding one or more sheets into the inlet end of the molding passage to travel through the passage along with the resin in process. Glass cloth, metal cloth and other heat-resisting sheet materials may be used for this purpose.

The various features and advantages of the invention may be understood by reference to the following detailed description together with the accompanying drawings.

In the drawings, which are to be regarded as merely illustrative:

FIG. 1 is a diagrammatic cross-sectional view of one embodiment of the invention for continuously molding a sheet of TFE resin;

FIG. 2 is a front elevation of the same embodiment viewed as indicated by the arrow 2 of FIG. 1;

FIG. 3 is a diagram showing graphically a typical temperature cycle;

FIG. 4 is a diagrammatic sectional view of a second embodiment of the invention for producing sheet material at a high production rate, the path of travel through the passage being relatively long and the passage being of stepped configuration to avoid excessive resistance to the movement of the material;

FIG. 5 is a front elevation of a modification of the apparatus for producing sheet material showing how a series of bores instead of a transverse slot may be employed as a heat barrier between successive zones;

FIG. 6 is a sectional view indicating how a single sheet of suitable material may be fed into the mold passage to form a laminated sheet product;

FIG. 7 is a view similar to FIG. 6 showing how two such sheets may be fed into the mold passage to form a laminated sheet product; and FIG. 8 is a simplified view, partly in side elevation and partly in section, showing a passage structure of stepped internal configuration for the production of rod stock at a high production rate.

FIGS. 1 and 2 show by way of example an embodiment of the invention for continuously producing a TFE resin sheet, generally designated S, the sheet being one inch thick and twelve inches wide. For this purpose, the apparatus shown in FIGS. 1 and 2 forms a straight passage 10 of the desired cross-sectional configuration to produce a one inch by twelve inch sheet, the passage dimensions being approximately 10% greater than the desired dimensions to allow for the final shrinkage as the formed sheet cools to room temperature.

The passage 10 is a substantially vertical passage and is formed by an upper heating stage structure and a lower cooling stage structure. As indicated in FIG. 1, the upper heating stage structure provides successive heating zones A and B and the lower cooling stage structure provides the next succeeding cooling zones C and D. The formed material hangs vertically downward from the lower discharge end of the cooling stage structure in a final zone E, with the formed sheet subjected to air cooling under the tension of its own weight.

The heating stage structure may be of the construction shown comprising two thick metal side plates 12 and two thick end plates 14. The two side plates provide an initial feed zone in which the granular material is rammed and preferably this initial feed zone is provided with external lateral grooves 15 in the two side plates 12 to serve as heat barriers. The grooves 15 retard heat flow from zone A to the initial feed zone, not only because they locally reduce the cross-sectional dimension of the metal structure with consequent reduction of conduction paths, but also because they provide additional exposed cooling surfaces for heat dissipation by radiation and convection.

The two zones A and B of the heating stage are separated by a heat barrier in the form of relatively wide and relatively deep external transverse grooves 16 in the two side plates 12. The temperature of the walls of the passage 10 in zone A of the heating zone is controlled by a plurality of heaters comprising a pair of lateral heating elements 18 on each of the side plates 12. A feature of this embodiment of the invention is the addition of a thick aluminum plate 20 between each of the pairs of heating elements 18 and the underlying side plate 12 of the passage structure. Such an aluminum plate by virtue of its high thermal conductivity distributes the heat uniformly from the two heating elements. Heat sensing means in the form of a thermocouple 22 extends through each of the aluminum plates 20 into the two side plates between each pair of heating elements 18 for automatic heat control at whatever temperature may be seelcted for zone A.

In like manner, zone B of the heating stage structure is heated by a pair of heating elements 24 that are mounted on an aluminum plate 25 on each side plate 12. Corresponding thermocouples 26 permit automatic control of the temperature of the walls of the passage 10 in this second zone. In addition, a vertical heating element 28 may be mounted on the two end plates 14 of the heating stage structure to extend over the two zones A and B.

The cooling stage structure is of the same general construction comprising two thick side plates 30 and two end plates 32. Zone C of the cooling stage structure is heated by a pair of lateral heating elements 34 on each of the two side plates 30 under the control of a corresponding thermocouple 35. In addition, short vertical heating elements 36 may extend over zone C on each of the end plates 32. Since the structure for the cooling stage is separate from the structure of the heating stage, the metal forming the walls of the passage 10 is discontinuous at the juncture 38 of the two stages and the discontinuity of the metal provides a heat barrier between the second zone B of the heating stage and the first zone C of the cooling stage.

Any suitable arrangement may be provided for ramming successive increments of the granular raw material into the upper inlet end of the passage 10. By way of example, FIG. 1 shows a hopper 40 provided with reciprocative gates 42 and 44 at different levels under the control of corresponding power cylinders 45 and 46. The hopper 40 feeds into a chute 48. The inclined bottom wall 50 of the chute 48 includes a pivoted wall member 52 controlled by a power cylinder 54 to swing between the retracted position shown in solid lines and the upright position shown in dotted lines. At its retracted position, the pivoted wall member 52 forms the lower end of the chute and at its vertical position it cooperates with a fixed wall structure 55 to form an upper extension of the passage 10.

A suitable ram 56 of the same cross-sectional configuration as the passage 10 is mounted in vertical guides 58 to reciprocate into and out of the fixed wall structure 55 for the purpose of ramming successive increments of the granular raw material into the passage 10. In the construction shown, the ram 56 is actuated by a piston rod 60 extending downward from a hydraulic power cylinder 62.

The manner in which the described feeding arrangement operates may be readily understood. With the lower gate 44 closed, the retraction of the upper gate 42 permits a predetermined increment of the granular material 64 in the hopper 40 to drop onto the lower gate. The upper gate 42 is then closed and the lower gate 44 opened to permit the increment of granular material to gravitate down the chute 48 onto the inner surface of the pivoted wall member 52. The pivoted wall member 52 is then shifted to its vertical position to crowd the granular material into the upper extension of the passage 10. The dimensions of the parts relative to the volume of the increment of granular material are such that the newly deposited increment does not reach the top level of the fixed wall structure 55. By virtue of this arrangement, all of the increment is trapped by the ram 56 on its downward movement by the hydraulic power cylinder 62. Suitable means (not shown) synchronizes the operation of the four power cylinders 45, 46, 54 and 62 to carry out the described feeding and ramming cycle.

It has been found that the pressure in the heating stage where the sintering of the resin occurs should be relatively high, preferably above 500 p.s.i., to avoid the formation of voids and to result in a high density product. A pressure of approximately 600 p.s.i. is preferred, but any substantial increase in the pressure above that magnitude results in the formation of the increments into discrete pellets instead of a continuous sheet.

The temperature of the walls of the passage 10 in the heating stage must be well above the transition temperature of the resin to insure the heating of the resin well above that temperature. It is also essential that the time interval during which each traveling increment is in the heating stage be long enough to permit sufficient heat transfer to the traveling material to raise the temperature of the material well above the transition temperature. The transition temperature of TFE resin is approximately 621° F. and the walls of the passage 10 in the heating stage should be at a temperature well above this transition temperature, for example at a temperature on the order of 700° F. The heating stage of the passage 10 is long enough for adequate heat transfer to heat the material to this temperature at the given rate of material travel.

In the initial embodiment of the invention, the effective length of the stroke of the ram 56, i.e., the length of stroke against the resistance of the granular raw material, is approximately two inches. The extent to which the material is compressed depends upon the grade of the material and the pressure to which it is subjected. In this instance, the resistance to movement of the resin through the passage 10 that is caused by friction is of sufficiently high magnitude to result in a pressure of approximately 600 p.s.i. in the heating stage and at this pressure two inches of the granular material of the selected grade is compressed to a dimension of slightly less than one-half inch. Consequently, the material moves through the passage 10 periodically at a rate depending upon the rate of reciprocation of the ram 56.

In this initial practice of the invention, the ram 56 reciprocates approximately twice per minute to cause the final product to issue from the discharge end of the passage 10 at a rate of approximately four to five feet per hour. Other grades of granular material may be compressed to a greater degree to cause the material to travel by smaller increments of motion and at less than four feet per hour.

FIG. 3 indicates the character of the temperature curve that is sought in a typical practice of the invention. The solid line temperature curve is plotted for the length of the side plates 12 of the heating stage and the adjacent side plates 30 of the cooling stage. The solid line temperature curve 65 shows by way of example the temperature levels that may be employed in the production of a sheet of one-quarter inch thickness. If the sheet material in thinner than one-quarter inch, slightly lower temperatures will be employed and if the thickness of the sheet is substantially greater than one-quarter inch, the temperature levels will be slightly higher.

The heating elements in the two zones A and B of the heating stage are controlled to maintain a temperature slightly higher than 700° F. along the passage 10. At this temperature and at a pressure of approximately 600 p.s.i., the granular material is sintered and converted into a solid amorphous or gelatinous body by the time the material reaches the end of the heating stage.

The purpose of the heaters in zone C of the cooling stage is to cause the sintered gelantinous material to cool at a controlled gradual rate. The rate of cooling is adjusted in accord with the degree of flexibility that is sought in the final product. With the temperature dropping relatively abruptly, as indicated by the slope 66, the resulting partially amorphous and partially crystalline sheet is relatively flexible. If a stiffer sheet is desired, the proportion of the final product that is crystalline is increased by providing for a slower cooling rate in zone C, for example the cooling rate indicated by the dotted line 68.

No heating elements are employed in zone D of the cooling stage but since there is not heat barrier between zones C and D, heat flows freely by conduction to zone D and the exposure to the ambient air of the wall structure in zone D results in a relatively gradual temperature gradient indicated in FIG. 3, the temperature dropping to approximately 350° F. at the discharge end of the passage 10.

The confinement of the formed sheet material by the walls of the passage 10 in the second cooling zone D results in relieving substantially all of the internal stresses to avoid buckling or waviness in the final sheet. This stress-relieving stage is important because the material tends to "creep" in the three initial zones A, B and C. "Creepage" is the tendency for the central material at the core of the sheet to travel faster than the peripheral portions of the sheet by reason of the frictional contact of the peripheral portions with the wall of the passage 10. It is primarily the internal stresses created by creepage that tend to make the finished product buckled or wavy in configuration.

The importance of zone E where the finished sheet is exposed to the ambient air is that any residual stresses that would still tend to distort the sheet are relieved because the suspended traveling sheet is placed under a final tension stress by its own weight while it is still heated above room temperature. After the continuously produced sheet passes through the final zone E, it is progressively disposed on the surface 70 of a horizontal conveyor means which travels at the rate of production of the sheet.

As heretofore stated, the pressure to which the resin is subjected in the heating stage depends upon the frictional resistance to the travel of the formed material through the passage 10. This pressure, then, may be varied by varying the length of the passage or by employing some expedient to increase or decrease the friction in a passage of a given length. It has been found that the frictional resistance to travel of the formed material may be increased by locally raising the temperature of the traveling material in zone B, the second zone of the heating stage, thereby to cause local expansion of the material with consequent increase of local pressure against the passage wall. This expedient may be used to make it possible to employ a relatively short passage that otherwise would be inoperative for the purpose of the invention. The dotted line 72 in FIG. 3 indicates how the temperature may be raised in zone B relative to zone A for this purpose.

The tendency for the gelatinous material to creep, with consequent development of internal stress, increases with the thickness of the sheet material and is quite pronounced when the sheet material is substantially thicker than one-half inch. It has been found, however, that elevating the temperature in zone B, as indicated by the dotted line 72, is effective to reduce creepage.

As heretofore stated, the rate of the travel of the plastic material through the passage may be greatly increased for corresponding increase in the rate of production, but the passage must be extended in length throughout the heating stage to permit the faster traveling material to be heated to the desired temperature range for sintering. Increasing the length of the passage, however, increases the resistance to travel of the material and may result in an intolerably high pressure in the heating stage. The embodiment of the invention shown in FIG. 4 shows how the length of the passage may be progressively increased in cross-sectional dimension to keep the frictional resistance within desired bounds.

The construction shown in FIG. 4 is largely identical to the construction of the first described embodiment of the invention. The usual ram 56a and the usual associated hopper and chute (not shown) are provided to force increments of the granular material into a passage 10a.

The heating stage in the lengthened apparatus is formed of the usual structure including a pair of relatively long side plates 12a. The lengthened heating stage has three zones, A, B and $B^1$. Each of these three heating zones includes two pairs of the previously described heating elements, there being one pair of heating elements 74 on each side of the zone mounted on a corresponding heat-distributing aluminum plate 75.

The cross-sectional dimensions of the passage 10a in zone A are sufficiently larger than the cross-sectional dimensions of the desired product to compensate for subsequent shrinkage. The cross-sectional dimensions of the passage 10a in the second zone B are increased as indicated by the steps or shoulders 76 in the two side plates 12a at the juncture of zone A with zone B. This increase may be on the order of 10%. In like manner, the cross-sectional dimension of the passage is increased again in the third zone $B^1$ as indicated by the steps or shoulders 77 at the juncture of zone B with zone $B^1$.

The second stage of the apparatus shown in FIG. 4 is similar in construction to the first described embodiment of the invention and includes the usual side plates 30a. The passage 10a in this heating stage is of the same cross-sectional dimensions as in zone $B^1$ of the heating stage. The cooling stage includes the usual zone C that is equipped with a pair of heating elements 78 on each of its opposite sides.

It is apparent that the lengthening of the heating stage in FIG. 4 permits the material to be forced through the passage 10a at an increased speed and at the same time keeps the traveling material in process in the heating stage long enough for the faster traveling material to reach the desired sintering temperature. It is further apparent that the progressive increase in the cross-sectional dimensions of the elongated passage 10a results in substantially less frictional resistance than would otherwise prevail.

The lengthening of the apparatus makes it easily possible to step up the rate of production of a sheet one inch thick and four feet wide from a rate of approximately four feet per hour to a rate of approximately sixteen feet per hour and it has been found that it is not necessary to increase the length of the structure fourfold to make possible such a fourfold increase in the rate of production. Increasing the length threefold is sufficient. The passage 10a is progressively increased in cross-sectional dimension by steps but it may be of a tapered configuration instead of a stepped configuration to serve the same purpose.

In FIG. 4, as in FIG. 1, heat barriers are provided wherever desired by external grooves in the passage. FIG. 5 indicates how such heat barriers may be provided by drilling rows of external blind bores 80 in the passage walls instead of providing grooves for this purpose.

FIG. 6 shows a ram 56b may be used to ram increments of the granular resin material into a passage 10b of the previously described construction. A strip of heat resistant material 90 is fed into the passage along one passage wall, the ram 56b being correspondingly smaller in cross-section than the passage. The strip 90 may be glass cloth, for example. The strip 90 travels with the material in process to become bonded thereto to form therewith a laminated sheet of two layers.

FIG. 7 shows how a ram 56c may force increments of the granular resin material into a passage 10c in the same manner between two strips 92 of heat resistant material to form a sheet of three laminations with the resin sandwiched between the two strips.

FIG. 8 shows diagrammatically a passage 81 of stepped configuration that may be used for the high speed production of rod stock. The structure 82 in FIG. 8 forms a passage 84 of round configuration, the passage being relatively long to permit the traveling material to reach sintering temperatures and being of stepped configuration for control of the frictional resistance. FIG. 8 shows two steps or inner circumferential shoulders 85 where the dimensions increase.

My description in specific detail of the selected embodiments of the invention will suggest various changes, substitutions and other departures from my disclosure within the spirit and scope of the appended claims.

I claim:

1. In an apparatus for the continuous molding of an elongated body of uniform cross-sectional configuration of a plastic material capable in granular form of being fused to a partially crystalline and partially amorphous state by heating above a critical temperature under pressure and wherein the flexibility of the product depends upon the proportion of the material that is in amorphous state, the combination of:
    a structure forming a passage of said cross-sectional configuration;
    means to ram increments of the granular material into one end of the passage to place the material therein under pressure by the opposition to the ramming action of the frictional resistance to travel of the material through the passage;
    means to deliver increments of the granular material periodically to the intake end of said passage;
    a wall member included in said passage structure and movable between a first position laterally of said passage to receive an increment of the granular material and a second position to shift the increment into said passage and to form a portion of the intake end of the passage to confine the increment;
    and means to heat a longitudinal portion of said passage structure to provide a heating stage for heating the traveling material in the passage to a temperature substantially above said critical temperature, the remaining longitudinal portion of said passage being at a lower temperature to provide a cooling stage.

2. A method of continuously molding a sheet of tetrafluoroethylene resin of a width several times its thickness, including the steps of:
    ramming successive increments of the resin into a first longitudinal portion of a passage of the cross-sectional configuration of the sheet to form a continuous moving mass and to place the mass under uniform surface pressure in the passage by the opposition to the ramming action of the frictional resistance to travel of the mass through the passage;
    concurrently with said ramming, heating a first longitudinal portion of the mass in the passage to raise the temperature thereof to a sintering temperature;
    pressure moving said mass through a second longitudinal portion of the passage downstream from said first portion;
    and controllably adding heat to said second longitudinal portion of said passage to controllably lower the temperature of the moving mass by exposure thereof below said sintering temperature and above ambient temperature, said temperature level in said second portion being controlled to maintain uniform surface pressure on said mass in said second portion of the passage.

3. The method as set forth in claim 2 which includes the step of heating a third longitudinal portion of the wall of said passage intermediate said first and second portions to a temperature higher than the temperature in said first portion to cause local expansion of the traveling material for increased local pressure of the traveling material against the passage wall for local increase in frictional resistance to travel of the material to reduce creepage in the traveling material.

4. A method of continuously fabricating a tetrafluoroethylene resin sheet of a width many times its thickness, having at least one lamination of a heat-resistant material including the steps of:
    ramming successive increments of the resin into a passage of the cross-sectional configuration of the sheet to form a moving mass and to place the mass under uniform surface pressure by the opposition to the ramming action of the frictional resistance to travel of the mass through the passage;
    simultaneously with said ramming, feeding a sheet of said heat-resistant material into the passage for travel along the passage with the traveling mass;
    concurrently with said ramming, heating the mass to raise the temperature thereof above a sintering temperature and to a level to effectively control said surface pressure;
    and concurrently with said ramming, moving said mass through a second longitudinal portion of the passage downstream from said first portion;
    and concurrently with said last mentioned motion of the mass through said second portion controllably adding heat to the mass in said second portion to effectuate therein a temperature level below said sintering temperature level to controllably cool said travelling mass while maintaining surface pressure thereon.

5. In a method according to claim 4, and including placing the mass under tension and concurrently further cooling same to relieve stress in the mass.

6. In an apparatus for continuously molding a sheet of tetrafluoroethylene resin, the combination of:
    a structure forming a passage of the cross-sectional configuration of the sheet;
    means to ram increments of the resin into one end of the passage to place the resin therein under pressure by the opposition to the ramming action of the frictional resistance to travel of the resin through the passage;
    means to heat a first longitudinal portion of the passage structure to provide a heating stage for heating the traveling resin in the passage to a sintering temperature and to maintain a uniform surface pressure on the resin;
    and means to controllably add heat to a second longitudinal portion of said passage structure downstream from said first longitudinal portion to a temperature below the sintering temperature for retarded cooling of the traveling resin while the resin is travelling under pressure, said last mentioned heat means being controllable whereby the passage of said resin through said second portion is accomplished while maintaining uniform surface pressure thereon.

7. An apparatus according to claim 6, wherein said passage is progressively enlarged at longitudinally spaced points.

8. In an apparatus for continuously molding a large surfaced uniformly thick sheet of synthetic resin, the combination of:
    a structure forming a first passage of the cross-sectional configuration of the sheet, said passage structure being divided into successive zones with the passage structure reduced in cross-section between the successive zones for retarding heat conduction from zone to zone;

means to ram increments of the resin into one end of the passage to place the resin therein under generally uniform surface pressure by the opposition to the ramming action of the frictional resistance to travel of the resin through the passage;

heating means contiguous to said passage structure to heat the passage structure to a temperature above the sintering temperature of the resin, said heating means being at least partially controllable to effectively maintain said generally uniform surface pressure on said resin;

and heating means downstream from said first mentioned heating means contiguous to said passage structure to controllably add heat to the downstream passage structure to effectuate therein a lower temperature for retarded cooling of the resin under controllable uniform surface pressure and to form said sheet.

9. An apparatus according to claim 8, and including means to tension said sheet while further cooling same to ambient temperature level.

10. An apparatus according to claim 8, and including heat barrier means arranged to provide a complete conductive heat barrier in said passage structure and separating the passage structure contiguous to said downstream heating means from the passage structure contiguous to said heating means adjacent said upstream passage structure.

References Cited in the file of this patent

UNITED STATES PATENTS

| | | |
|---|---|---|
| 57,764 | Putte | Sept. 4, 1866 |
| 1,904,197 | Bond | Apr. 18, 1933 |
| 2,332,829 | Parsons et al. | Oct. 26, 1943 |
| 2,335,308 | Pendergrast et al. | Nov. 30, 1943 |
| 2,537,977 | Dulmage | Jan. 16, 1951 |
| 2,592,470 | Ryberg | Apr. 8, 1952 |
| 2,732,592 | Tunnicliff et al. | Jan. 31, 1956 |
| 2,838,740 | Larky et al. | June 10, 1958 |
| 2,872,965 | Sisson | Feb. 10, 1959 |
| 2,915,786 | Haroldson et al. | Dec. 8, 1959 |

OTHER REFERENCES

Information Bulletin, No. X-52, "Teflon Ram Extrusion," E. I. du Pont de Nemours & Co. (Inc.), Wilmington, Del., Nov. 15, 1954. (Copy in 18-55V and S.)